(12) United States Patent
Tobler et al.

(10) Patent No.: US 11,931,762 B2
(45) Date of Patent: Mar. 19, 2024

(54) DILUTE PHASE POWDER PUMP AND METHOD FOR OPERATING A DILUTE PHASE POWDER PUMP

(71) Applicant: GEMA SWITZERLAND GMBH, St. Gallen (CH)

(72) Inventors: Roger Tobler, Herisau (CH); Marco Sanwald, Abtwil (CH); Felix Mauchle, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 447 days.

(21) Appl. No.: 17/309,352

(22) PCT Filed: Dec. 19, 2019

(86) PCT No.: PCT/EP2019/086405
§ 371 (c)(1),
(2) Date: May 20, 2021

(87) PCT Pub. No.: WO2020/141090
PCT Pub. Date: Jul. 9, 2020

(65) Prior Publication Data
US 2022/0016653 A1    Jan. 20, 2022

(30) Foreign Application Priority Data
Dec. 31, 2018    (DE) .......................... 102018133713.2

(51) Int. Cl.
*B05B 7/14*    (2006.01)
*B05B 12/00*    (2018.01)
(Continued)

(52) U.S. Cl.
CPC .......... *B05B 7/1472* (2013.01); *B05B 12/006* (2013.01); *B65G 53/40* (2013.01); *F04F 5/14* (2013.01)

(58) Field of Classification Search
CPC ... B05B 7/1472; B05B 12/006; B05B 5/1683; B05B 7/1404; B65G 53/40; F04F 5/14; F04F 5/44; F04F 5/52; F04F 5/54
See application file for complete search history.

(56) References Cited

U.S. PATENT DOCUMENTS 4,480,947 A * 11/1984 Nagasaka ................. G01F 1/74
                                                      406/14
4,747,731 A    5/1988 Nagasaka et al.
(Continued)

FOREIGN PATENT DOCUMENTS

DE            4405640 A1    8/1994
DE        102014105044 A1   10/2015
(Continued)

OTHER PUBLICATIONS

International Search Report and Written Opinion dated Apr. 17, 2020, for corresponding PCT Application No. PCT/EP2019/086405.
(Continued)

*Primary Examiner* — Vishal Pancholi
(74) *Attorney, Agent, or Firm* — Kinney & Lange, P.A.

(57) ABSTRACT

A dilute phase powder pump for pumping powder, particularly coating powder, from a powder reservoir to a powder spray-coating device, includes a powder inlet, which is or can be flow-connected to the powder reservoir, and a powder outlet, which is or can be flow-connected to the powder spray-coating device. The dilute phase powder pump also has a powder pumping injector with a motive fluid nozzle and a converging inlet nozzle, and has a valve device for optionally interrupting a flow connection between the powder inlet (80) of the dilute phase powder pump and a powder inlet of the motive fluid nozzle.

12 Claims, 3 Drawing Sheets

(51) Int. Cl.
  *B65G 53/40* (2006.01)
  *F04F 5/14* (2006.01)

(56) References Cited

U.S. PATENT DOCUMENTS

| | | | | |
|---|---|---|---|---|
| 4,900,199 A * | 2/1990 | Spaulding | ............ | B05B 7/1463 |
| | | | | 406/123 |
| 5,487,624 A * | 1/1996 | Toyota | .................. | B05B 12/085 |
| | | | | 406/14 |
| 5,615,980 A * | 4/1997 | Mauchle | ............... | B05B 7/1472 |
| | | | | 406/138 |
| 5,739,429 A * | 4/1998 | Schmitkons | .......... | B05B 12/085 |
| | | | | 73/196 |
| 2020/0047200 A1 * | 2/2020 | Sanwald | ............... | B05B 7/1472 |

FOREIGN PATENT DOCUMENTS

| DE | 102017103316 A1 | 8/2018 |
|---|---|---|
| EP | 0423850 A2 | 4/1991 |

OTHER PUBLICATIONS

First German Office Action dated Mar. 3, 2021, for corresponding German Application No. 102018133713.2.
English translation of International Preliminary Report on Patentability dated Apr. 14, 2021, for corresponding PCT Application No. PCT/EP2019/086405.

\* cited by examiner

DILUTE PHASE POWDER PUMP AND METHOD FOR OPERATING A DILUTE PHASE POWDER PUMP

CROSS-REFERENCE TO RELATED APPLICATION(S)

The present application is the national phase of PCT Application No. PCT/EP2019/086405 filed on Dec. 19, 2019, which in turn claims priority to German Application No. 102018133713.2 filed on Dec. 31, 2018, both of which are incorporated by reference herein.

BACKGROUND

The present disclosure relates to a dilute phase powder pump for conveying coating powder from a powder reservoir to a powder spraying device, wherein the dilute phase powder pump exhibits a powder inlet which is fluidly connected or connectable to the powder reservoir and a powder outlet which is fluidly connected or connectable to the powder spraying device, and wherein the dilute phase powder pump comprises a powder-conveying injector having a drive nozzle and a collecting nozzle.

Known in general from powder coating technology is the use of powder-conveying injectors to convey coating powder utilizing the so-called Venturi effect to pump in particular fluidized coating powder from a powder reservoir (powder storage container) with the help of conveying air and conduct it through the collecting nozzle via for example a powder supply hose of a powder spraying device in the form of e.g. a coating gun. The collecting nozzle, which is usually realized as an elongated hollow body, forms a so-called stream collecting channel in its interior to do so, into which the powder/air mixture to be conveyed is introduced.

The stream collecting channel of the collecting nozzle lies axially upstream opposite a drive or conveying jet nozzle through which driving or conveying air is pressed into the collecting nozzle. A high-velocity airstream forms due to the relatively small diameter of the driving or respectively conveying jet nozzle, whereby a negative pressure develops in a directly adjacent powder supply channel fluidly connected to the powder reservoir. Due to the negative pressure, the usually fluidized coating powder is conveyed out of the powder reservoir (powder storage container) to the powder supply channel in the direction of the collecting nozzle and conducted through it to the powder supply hose.

A powder-conveying injector of this type with a corresponding Venturi nozzle arrangement is known for example from the German published application DE 198 24 802 A1.

Powder-conveying injectors known from the prior art have the disadvantage that the airstream and the powder particles wear down the drive nozzle and the collecting nozzle and in particular the stream collecting channel of the collecting nozzle. Due to the abrasive effect of the coating powder, which is conducted through the collecting nozzle at high speed, particularly the stream collecting channel of the collecting nozzle is subject to relatively high wear, which is generally noticeable as a result of the material removal leading to a widening of the stream collecting channel resulting in a drop in pressure. Continually more driving or conveying air is therefore necessary over time to convey the coating powder, which on the one hand is uneconomical and on the other hand can also lead to unsatisfactory coating results due to uneven clouds of coating powder or the amount of powder to be conveyed decreasing over time respectively.

For this reason, it is necessary to regularly replace the collecting nozzle in powder-conveying injectors. Alternatively or additionally thereto, it is known from e.g. DE 198 24 802 A1 to form the stream collecting channel of the collecting nozzle from a relatively hard material, in particular a glass-like material.

The present disclosure is based on the problem that in practical operation of a dilute phase powder pump with powder-conveying injector, the right time at which to replace the collecting nozzle of the powder-conveying injector is often not apparent to the operator of the dilute phase powder pump. This is because it is customary in practical operation to visually observe the cloud of coating powder directed at an object to be coated and to use this visual observation to accordingly readjust the pressures of the conveying air and the supplementary air so that the total amount of powder conveyed by the dilute phase powder pump does not fall below a desired minimum value. The collecting nozzle of the powder-conveying injector is normally not replaced until the desired minimum powder volume is no longer able to be achieved in the powder spraying device through the appropriate readjusting of the conveying air and supplementary air pressures. From an economic perspective and as regards an optimal coating result, however, this point in time is well past the time at which replacement of the collector nozzle is actually recommended.

On the basis of this problem at set forth, the present disclosure is based on the task of further developing a dilute phase powder pump of the type cited at the outset to the effect of it being able to be used as economically as possible even without the operator having copious experience, whereby an optimal coating result and in particular uniform clouds of coating powder are at the same time achievable with the powder spraying device fluidly connected to the dilute phase powder pump.

SUMMARY

Accordingly, a dilute phase powder pump is in particular proposed for conveying coating powder from a powder reservoir to a powder spraying device, wherein the dilute phase powder pump exhibits a powder inlet, which is fluidly connected or connectable to the powder reservoir, and a powder outlet, which is fluidly connected or connectable to the powder spraying device. The dilute phase powder pump comprises a powder-conveying injector having a drive nozzle and a collecting nozzle. According to the present disclosure, it is particularly provided for the dilute phase powder pump to further comprise a valve device in order to be able to selectively interrupt a fluidic connection between the powder inlet of the dilute phase powder pump and a powder inlet of the drive nozzle.

According to embodiments of the disclosed dilute phase powder pump, the valve device comprises a pneumatically actuatable pinch valve provided in the flow path between the powder inlet of the dilute phase powder pump and the powder inlet of the drive nozzle.

The providing of a valve device for selectively interrupting a fluidic connection between the powder inlet of the dilute phase powder pump and a powder inlet of the drive nozzle has various advantages such as, for example, simplified and particularly efficient cleaning of the dilute phase powder pump or the powder-conveying injector respectively, e.g. when changing powder. The valve device can to that end be used to interrupt the flow path between the powder inlet of the dilute phase powder pump and the powder inlet of the drive nozzle, which allows the conveying air and/or the supplementary air, or the supplementary air as purge air respectively, to clean the components of the powder-conveying injector as well as the components arranged downstream of the powder-conveying injector, in particular the powder outlet of the dilute phase powder pump, a powder hose connected to the powder outlet of the dilute phase powder pump and/or a powder spraying device connected to the outlet of the dilute phase powder pump.

According to embodiments of the disclosed dilute phase powder pump, it further comprises a compressed air inlet device which opens into the fluidic connection between the powder inlet of the dilute phase powder pump and the powder inlet of the drive nozzle at least at one point, whereby the compressed air inlet device serves to supply compressed air as purge air as required and in particular for cleaning/flushing the powder-conveying injector or the components provided downstream of the powder-conveying injector respectively.

In a powder-conveying mode of the dilute phase powder pump, however, additional compressed air can be fed as needed into the fluidic connection between the powder inlet of the dilute phase powder pump and the powder inlet of the drive nozzle as additional compressed conveying air via the compressed air inlet device.

According to embodiments of the disclosed dilute phase powder pump, it is in particular provided for the compressed air inlet device to open into the fluidic connection at a point between the valve device and the powder inlet of the drive nozzle. This embodiment has the particular advantage of automatic functional testing being able to be realized with the dilute phase powder pump.

It is thus for example conceivable for the compressed air inlet device to be allocated a filter which is permeable to air but not to coating powder, whereby at least one pressure sensor is connected to a compressed air path which extends from a compressed air line allocated to the compressed air inlet device to the air side of the filter, wherein the filter separates the air side from the fluidic connection between the powder inlet of the dilute phase powder pump and the powder inlet of the drive nozzle.

The providing of such a pressure sensor, which in general terms is to be designed so as to detect static and/or dynamic pressure in an area in the fluidic connection between the powder inlet of the dilute phase powder pump and the powder inlet of the drive nozzle, makes it possible to automatically detect the wear or degree of wear of the collecting nozzle, particularly by means of a corresponding device for functional testing or an evaluation device allocated to that end respectively.

Particularly used for this purpose is an evaluation device which is designed to determine the collecting nozzle wear or degree of wear on the basis of a pressure value detected by the pressure sensor as well as on the basis of an amount of conveying air supplied to the powder-conveying injector per unit of time and/or an amount of supplementary air supplied to the powder-conveying injector per unit of time.

In this context, it is particularly conceivable for the valve device to be actuated for this purpose so that the flow path between the powder inlet of the dilute phase powder pump and the powder inlet of the drive nozzle is interrupted, whereby the amount of conveying air and supplementary air supplied to the powder-conveying injector per unit of time is in particular maximized and the negative pressure then building is measured via the pressure sensor. The measured pressure value characterizes its direct relationship to the degree of wear (diameter) of the collecting nozzle.

In preferential implementations of the disclosed solution, the dilute phase powder pump has a conveying air inlet allocated to the powder-conveying injector for supplying conveying air to the drive nozzle of the powder-conveying injector and a supplementary air inlet allocated to the powder-conveying injector for supplying supplementary air into the flow path of a powder/conveying air mixture at the powder outlet of the dilute phase powder pump. At least one conveying air setting element is preferably further provided for setting a volume of conveying air supplied to the conveying air inlet per unit of time and/or for setting a volume of supplementary air supplied to the supplementary air inlet per unit of time.

The conveying air setting element comprises for example an appropriate throttle device in order to be able to precisely regulate the corresponding flows of compressed air, thus in minute small steps or steplessly and thereby continuously. The most precise and optimal settings possible as regards a volume of conveying air fed to the conveying air inlet per unit of time and an amount of supplementary air fed to the supplementary air inlet per unit of time is critical to obtaining good coating quality and achieving good efficiency in terms of the amount of coating powder required.

The throttle device can for example comprise a corresponding throttle valve and a controllable electric motor having a motor shaft for adjusting the throttle valve. The motor can be any type of motor which has a motor shaft able to be controllably adjusted to defined rotational angle positions, preferably an electric step motor.

In conjunction hereto, it is advantageous not just for an amount of compressed air supplied to the conveying air inlet or the supplementary air inlet respectively per unit of time to be set via the compressed air setting element but also for the corresponding actual value of the compressed air rate supplied to the conveying air inlet or the supplementary air inlet to be able to be determined, in particular detected.

According to embodiments of the disclosed dilute phase powder pump, the aforementioned evaluation device of the functional testing device is not only designed to detect the wear or degree of wear of the collecting nozzle of the powder-conveying injector but also detect at least one and preferably all of the following situations:

an at least partial blockage at the powder outlet of the dilute phase powder pump;

an at least partial blockage at the powder inlet of the dilute phase powder pump; and a deficiency of coating powder in the powder reservoir fluidly connected to the powder inlet of the dilute phase powder pump.

The evaluation device detects at least one of these situations in particular factoring in the pressure value detected by the at least one pressure sensor and factoring in an actual value of a volume of conveying air fed to the conveying air inlet per unit of time and based on an actual value of a volume of supplementary air fed to the supplementary air inlet.

According to further developments of the disclosed dilute phase powder pump, at least one actual powder rate value sensor is further provided which is arranged in or near the powder-conveying injector on or in the flow path of the powder/conveying air mixture at the powder outlet of the dilute phase powder pump and serves to detect a corresponding actual powder rate value delivered by the powder-conveying injector. The detected actual value is preferably likewise accordingly evaluated by the evaluation device, particularly factoring in an actual value of the volume of conveying air supplied to the conveying air inlet per unit of time and an actual value of the volume of supplementary air supplied to the supplementary air inlet per unit of time.

This thereby in particular enables the actual value of the volume of conveying air supplied to the conveying air inlet per unit of time and/or the actual value of the volume of supplementary air supplied to the supplementary air inlet per unit of time to be set preferably automatically, and even more preferentially selectively automatically, such that the actual powder rate value at the powder outlet of the dilute phase powder pump does not exceed a predefined or definable minimum value nor exceed a predefined or definable maximum value.

According to a further development of the disclosed solution, the evaluation device of the dilute phase powder pump is allocated a storage device in which corresponding target static pressure values within an area in the fluidic connection between the valve device and the powder inlet of the drive nozzle are stored for different powder hoses fluidly connected to the powder outlet of the dilute phase powder pump, particularly for defined values of the volume of conveying air supplied per unit of time to the conveying air inlet of the powder-conveying injector and the volume of supplementary air supplied per unit of time to the supplementary air inlet of the powder-conveying injector. It is possible with this embodiment for the evaluation device to detect the parameters of a powder hose actually connected fluidly to the powder outlet of the dilute phase powder pump, and in particular its length and/or its flow resistance, namely by detecting an actual static pressure value within the area in the fluidic connection between the valve device and the powder inlet of the drive nozzle at the defined values of the volume of conveying air supplied to the conveying air inlet per unit of time and the volume of supplementary air supplied to the supplementary air inlet per unit of time and comparing it to the corresponding target values stored in the storage device.

BRIEF DESCRIPTION OF THE DRAWINGS

The following will reference the accompanying drawings in describing exemplary embodiments of the present disclosure in greater detail.

Shown are.

DETAILED DESCRIPTION

A jet pump with a powder-conveying injector which works according to the injector principle or Venturi tube principle is normally used to convey powder, particularly coating powder, from a powder reservoir (for example in the form of a drum or a powder container) to a spraying device such as a spray gun. In the powder-conveying injector, a current of air generates a negative pressure in a negative pressure area formed by channel widening which is used to draw powder, e.g. coating powder, from the powder reservoir. The withdrawn powder is entrained by the current and carried to the spraying device. By regulating the airstream's rate of flow, the negative pressure and thus the amount of powder conveyed can be regulated.

In order to achieve a constant powder/air mixture flow rate downstream of the powder outlet of the powder-conveying injector, the air speed in the fluid lines, thus in particular in the powder supply hoses, must approximate 10 to 15 m/sec. At a lower air speed in the fluid line, powder conveyance becomes uneven; a pulsation of the powder/air mixture occurs which propagates until the powder emerges at the powder spraying device. At a higher air speed, the electrostatic application of the coating powder onto the object to be coated is greatly impeded because there is then the risk of blowing off the powder which had already been deposited on the object.

Depending on the requirements of the coating process, the amount of powder fed to the powder spraying device is increased or decreased. A practical value for the amount of powder supplied per unit of time is approximately 300 g/min. If the amount of powder supplied per unit of time needs to be reduced, the pressure of the conveying air fed to the powder-conveying injector is first reduced. This thereby reduces the flow rate of the conveying air in the fluid lines. Yet the total air volume must neither be too low nor exceed a maximum value. In order to offset this reduction in air volume; i.e. return to an air speed of at least 10 m/sec while maintaining the reduced powder output, more supplementary air is furnished to the powder-conveying injector.

The known function of powder-conveying injectors is as follows: The conveying air generates a negative pressure in the powder-conveying injector via which coating powder is drawn in from a powder reservoir, swept along by the conveying air and fed to the powder spraying device through a fluid line such as e.g. a powder hose. By changing the pressure and thus also the volume of conveying air, the amount of coating powder conveyed per unit of time can be regulated. Since the conveying capacity depends on the magnitude of the negative pressure generated by the conveying air in the powder-conveying injector, the conveying capacity at constant or variable conveying air can also be regulated by supplementary air being introduced into the negative pressure area of the injector via a compressed air inlet device in order to thereby change the magnitude of the negative pressure pursuant to the desired pressure feed rate. This means that the powder conveying rate not only depends on the volume of conveying air but also the difference between the conveying air minus the supplementary air. However, for the reasons mentioned at the beginning, the total volume of air which transports the coating powder must remain constant for a particular coating process.

In practice, the operator observes the coating powder cloud directed at the object to be coated and sets the conveying air and supplementary air pressures based on this visual observation. However, this manually performed setting requires a certain degree of experience on the part of the operator. Furthermore, the powder conveying capacity of the powder-conveying injector varies during operation. This is in particular due to the fact of the airflow and the powder particles wearing away the drive nozzle and the stream collecting channel of the powder-conveying injector during operation. This has the disadvantage, subject to the degree of wear, of also changing the volumetric flow rate of the powder (amount of powder conveyed per unit of time), which results in unequal coating thicknesses and coating qualities on an object to be coated.

The present disclosure is therefore based, inter alia, on the problem that during operation of a powder-conveying injector, it is often only possible for a highly-experienced operator to assess when the collecting nozzle and/or stream collecting channel of the collecting nozzle is actually so worn that it needs to be replaced. Moreover seen as problematic has been the fact of frequently not being able to set exactly the right conveying air and supplementary air pressures in light of the wearing down of the drive nozzle and the stream collecting channel.

In particular recognized in the present case is the increasing need for a dilute phase powder pump in which the degree of collecting nozzle wear can be automatically detected. Other functions should moreover also be automatically recognized such as, for example, blockages in the powder intake hose, etc.

Figure 1:
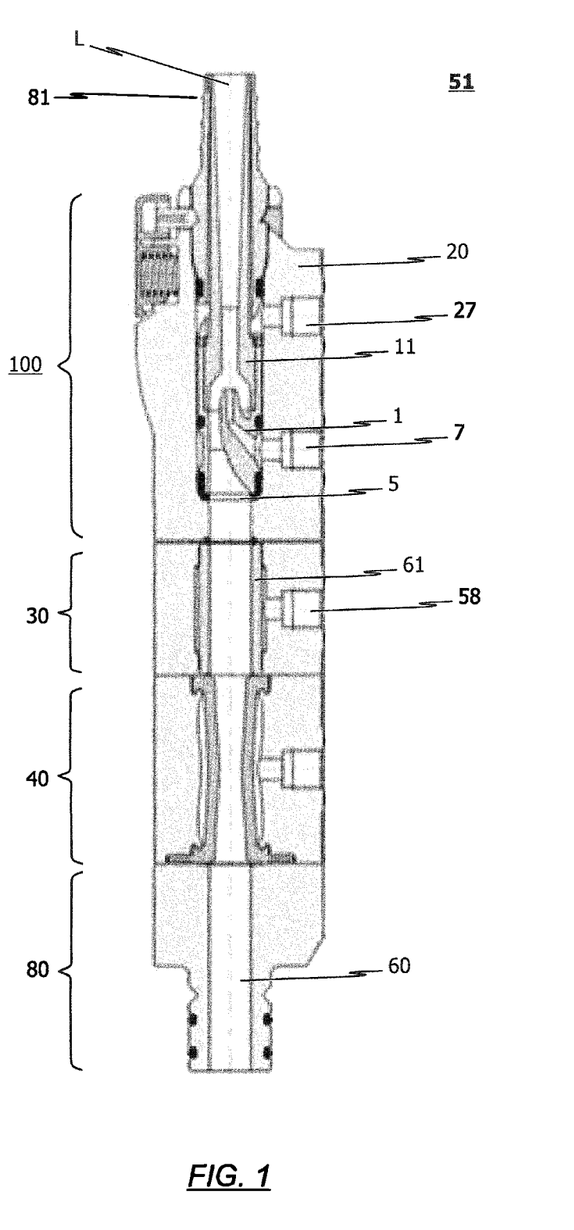
FIG. 1 a schematic sectional view of an exemplary embodiment of the dilute phase powder pump according to the present disclosure.

FIG. 1 shows a schematic and sectional view of a preferential embodiment of the dilute phase powder pump 51 which is designed for conveying powder, coating powder respectively, from a powder reservoir (not shown in FIG. 1) to a powder spraying device (likewise not shown in FIG. 1).

The powder spraying device can be a manually operated spray gun or an automatically controllable spraying device. It preferably contains at least one high-voltage electrode which is supplied with high voltage from a high-voltage source for the electrostatic charging of the coating powder sprayed by the powder-spraying device. The high-voltage source can be integrated in the powder spraying device. The powder spraying device can exhibit a spray opening or a rotary atomizer.

A powder reservoir in the sense of the present disclosure preferably comprises at least one powder container having a powder chamber from which powder, coating powder respectively, is extracted via the dilute phase powder pump 51 by means of negative pressure, after which the powder/coating powder flows from the dilute phase powder pump 51 to a corresponding powder spraying device under positive pressure.

The powder container preferably comprises at least one powder outlet opening to which the powder inlet of the dilute phase powder pump is connected. Particularly conceivable in this context is for the at least one powder outlet opening of the powder container to be arranged in a side wall of the powder container.

The powder chamber of the powder reservoir can be provided with a fluidizing device for fluidizing the coating powder accommodated in the powder chamber of the powder container. The fluidizing device can comprise at least one fluidizing wall of an open-pored material or a material provided with narrow holes which is permeable to compressed air but not, however, powder or coating powder respectively. Particularly advantageous in this context is for the fluidizing wall in the powder container of the powder reservoir to form the bottom of the powder container and be arranged between the powder chamber of the powder container and a fluidizing compressed air chamber.

An exemplary embodiment of a powder reservoir realized as a powder container in the sense of the present disclosure is for example described in the EP 2 675 574 A2 printed publication.

The exemplary embodiment of the dilute phase powder pump 51 according to the present disclosure, as shown schematically in FIG. 1, is characterized by a modular construction and essentially consists of a powder inlet module 80, a pinch valve module 40, a compressed air inlet module 30 and a powder-conveying injector 100 designed as a pump module at the powder outlet 81 of the dilute phase powder pump 51. These modules are preferably detachably connected to each other in order to form a particularly compact dilute phase powder pump 51.

As schematically depicted in FIG. 1, the dilute phase powder pump 51 comprises a powder inlet 80 which is fluidly connected or connectable via a powder line (not shown in FIG. 1), particularly an intake hose or the like, to the previously mentioned powder reservoir (likewise not shown in FIG. 1).

A powder outlet 81 is provided at an opposite end region of the dilute phase powder pump 51 which is fluidly connected or connectable via a powder line (not shown in FIG. 1), particularly a powder hose, to a powder inlet of a powder spraying device (a coating gun in particular).

Specifically, in the exemplary embodiment shown in FIG. 1, both the powder inlet 80 of the dilute phase powder pump 51 as well as the powder outlet 81 of the dilute phase powder pump 51 are respectively designed as a hose connector to which the corresponding powder line/corresponding powder hose can be attached and fixed by means of e.g. a hose clamp. Of course, other embodiments for the powder inlet 80 or powder outlet 81 respectively of the dilute phase powder pump 51 are also possible.

The powder inlet 80 and the powder outlet 81 preferably lie on a common longitudinal axis L (see FIG. 3) in order to achieve no deflection or only slight deflection of the powder/coating powder to be conveyed within the dilute phase powder pump 51, which considerably reduces the turbulence of the powder/air mixture in the dilute phase powder pump 51.

The dilute phase powder pump 51 comprises a powder-conveying injector 100 which works according to the injector principle or the Venturi tube principle. The dilute phase powder pump 51 has a powder-conveying injector 100 to that end in which a current of air generates a negative pressure in a negative pressure area formed by channel widening, whereby said negative pressure is used to draw powder, or coating powder respectively, from the powder reservoir via the powder inlet 80 of the dilute phase powder pump 51. The withdrawn powder or coating powder is entrained by the current and carried to the spraying device. By regulating the airstream's rate of flow, the negative pressure and thus the amount of powder conveyed can be set.

Figure 2:
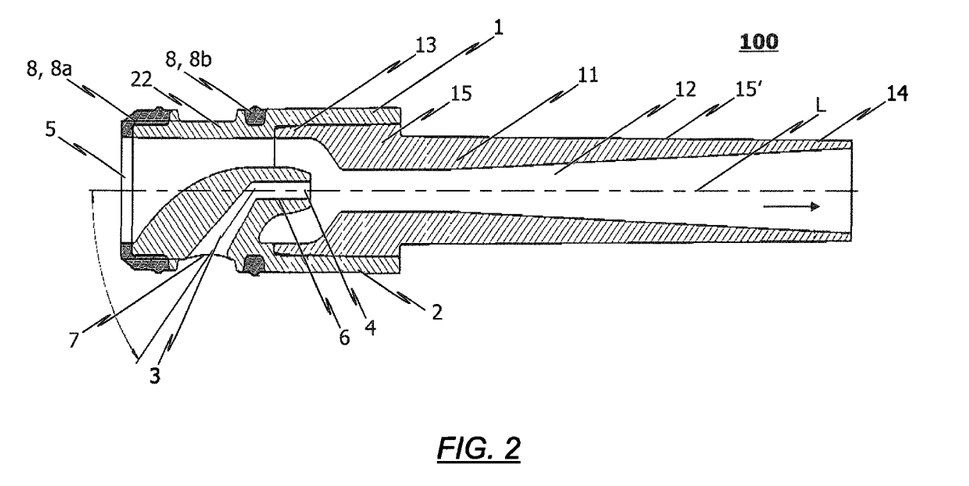
FIG. 2 a schematic sectional view of a powder-conveying injector of the dilute phase powder pump according to FIG. 1 in a disassembled state.
Figure 3:
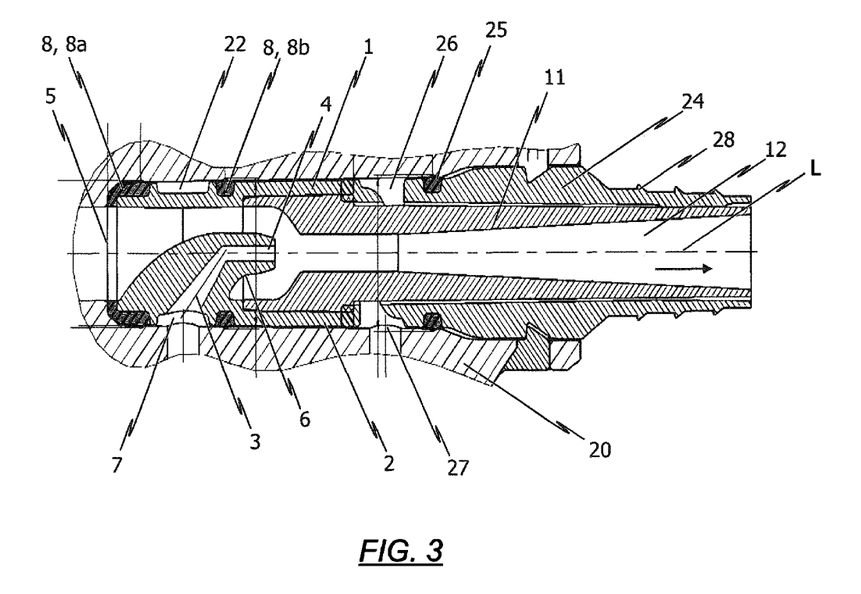
FIG. 3 a schematic sectional view of the powder-conveying injector according to FIG. 2 in its assembled state in a housing of the dilute phase powder pump.

The following will firstly reference the illustrations provided in FIGS. 2 and 3 in describing an exemplary embodiment of a powder-conveying injector 100 suitable for use in the dilute phase powder pump 51 in greater detail.

The exemplary embodiment of the powder-conveying injector 100 exhibits a first region which serves as a drive nozzle 1 and a second region which serves as a collecting nozzle 11. The second region of the powder-conveying injector 100, which serves as a collecting nozzle 11, has a channel with a longitudinal axis L serving as a stream collecting channel 12 in its interior. A mixture of powder/coating powder and conveying air flows through this channel when the powder-conveying injector 100 is for example used in a dilute phase powder pump 51 to convey powder.

The channel, which is also referred to below as the stream collecting channel 12 or the powder flow channel, exhibits a longitudinal axis L, whereby the direction of flow is indicated in FIG. 2 by an arrow. The mixture of powder/coating powder and conveying air to be conveyed enters the second region serving as a collecting nozzle 11 at a funnel-shaped nozzle inlet 13 and exits the collecting nozzle 11 again at a nozzle outlet 14.

At least in the area of the nozzle inlet 13 and the area of the nozzle outlet 14, the second region serving as a collecting nozzle 11 is cylindrical on the outside such that corresponding cylindrical guide surfaces 15, 15' are formed.

The first region of the powder-conveying injector 100 arranged upstream of the second region (collecting nozzle 11) assumes the function of a drive nozzle 1. The first region (drive nozzle 1) essentially consists of a drive nozzle housing 2 having a conveying air duct 3 and a nozzle 4 fluidly connected to the conveying air duct 3, the nozzle opening of which is disposed axially opposite the stream collecting channel 12.

Although not depicted in FIG. 2, it is conceivable for the nozzle 4 or the nozzle opening respectively to be formed by a nozzle tip designed as a metal insert and in particular able to be inseparably connected to the drive nozzle housing 2.

In the powder-conveying injector 100 shown schematically in FIG. 2 in a sectional view, it can be provided for the first region serving as drive nozzle 1 and the second region serving as collecting nozzle 11 to be joined together as one component and inseparably connected to one another. In conjunction hereto, it is in principle conceivable for the first and second region 1, 11 of the powder-conveying injector 100 to be integrally formed from one and the same material, for example as an injection-molded component.

Alternatively thereto, and as schematically indicated in FIG. 2, the first and second region 1, 11 of the powder-conveying injector 100 can also be formed separately, whereby these two regions 1, 11 are then detachably or inseparably connected together, for example by insertion, adhesion or pressing. This would have the advantage of the two regions 1, 11 of the second region 11 of the powder-conveying injector 100 being able to be formed from different materials, particularly different plastic materials.

A further advantage of this embodiment is that the second region 11 of the powder-conveying injector 100, which is of rotationally symmetrical design with respect to the longitudinal axis L of the stream collecting channel 12, can be formed as a turned part. This simplifies in particular the manufacture and assembly of the second region 11 of the powder-conveying injector 100. Furthermore, the second region 11 of the powder-conveying injector 100 can be replaced separately when needed; i.e. without the first region 1 of the powder-conveying injector 100.

The exemplary embodiment of the powder-conveying injector 100, as shown for example schematically in FIG. 2 in a sectional view, is moreover characterized by thereby being a so-called "inline" powder-conveying injector 100, which means that the powder/coating powder to be conveyed via the powder-conveying injector 100 flows axially along the longitudinal axis L of the stream collecting channel 12 through the entire powder-conveying injector 100 (and preferably also through the entire dilute phase powder pump 51).

In particular provided in the exemplary embodiment of the powder-conveying injector 100 is for the first region 1 of the powder-conveying injector 100 to exhibit a powder inlet 5 axially opposite of the nozzle outlet 14 of the second region (collecting nozzle 11) or the powder outlet of the dilute phase powder pump 51 respectively.

What this axial arrangement of the powder inlet 5 and powder outlet 14 can achieve is the powder/coating powder to be conveyed not being deflected or only slightly deflected within the powder-conveying injector 100, which considerably reduces the turbulence of the powder/air mixture in the powder-conveying injector 100.

Moreover, the powder/air mixture is only subject to minimal flow resistance in the powder-conveying injector 100, which overall increases the conveying capacity which the powder-conveying injector 100 is able to achieve with the same volume of conveying air.

Specifically, and as schematically indicated in FIG. 2, the first region of the powder-conveying injector 100, which serves as drive nozzle 1, is of substantially cylindrical construction and exhibits a drive nozzle housing 2 having an essentially cylindrical outer surface. At least some areas of said drive nozzle housing 2 define an interior conveying air duct 3 arranged axially or at least substantially axially with respect to the longitudinal axis L of the stream collecting channel 12. A nozzle projection 6 in which the nozzle opening 4 of the drive nozzle 1 is formed extends into the conveying air duct 3.

The nozzle opening 4 is fluidly connected via the conveying air duct 3 to a conveying air inlet 7 arranged and aligned non-axially with respect to the longitudinal axis L of the channel of the second region 11 serving as stream collecting channel 12. On the other hand—as already stated—the nozzle opening 4 of the drive nozzle 1 is arranged axially with respect to the longitudinal axis L of the stream collecting channel 12.

When the powder-conveying injector 100 is in operation, conveying air is supplied via the conveying air inlet 7 of the drive nozzle 1, said air flowing out toward the stream collecting channel 12 via the nozzle opening 4 of the drive nozzle 1. Due to the nozzle-shaped configuration of at least the upstream region of the stream collecting channel 12, the conveying air is pressed into the collecting nozzle 11 and, because of the relatively small diameter of the nozzle opening 4 of the drive nozzle 1, a high-speed airflow is formed, whereby a negative pressure forms in the area of the powder inlet 5 of the powder-conveying injector 100. As a result of this negative pressure forming in the powder inlet area during the operation of the powder-conveying injector 100, coating powder is drawn in when the powder inlet 5 of the first region 1 of the powder-conveying injector 100 serving as the drive nozzle 1 is fluidly connected to a suitable powder container or the like via a powder channel of the dilute phase powder pump 51 and/or via a powder line, etc.

As indicated schematically in FIG. 2, the drive nozzle housing 2 has a cylindrical inner contour at its downstream end region into which the upstream end region of the second region 11 of the powder-conveying injector 100; i.e. the upstream end region of the area of the powder-conveying injector 100 serving as collecting nozzle 11, can be inserted and accordingly connected detachably or non-detachably to the drive nozzle housing 2 (for example by clamping, adhesion or pressing).

On the whole, the first and second regions 1, 11 of the powder-conveying injector 100 are thus joined together as one component. These two regions 1, 11, which are joined together as one component have an overall outer contour which is preferably rotationally symmetric with respect to the longitudinal axis L of the stream collecting channel 12. This thereby enables the powder-conveying injector 100 to be inserted into a seating 21 of a housing 20 of the dilute phase powder pump 51 in any given manner without the user needing to pay attention to a specific orientation of the nozzle arrangement 100.

As can further be seen from the schematic sectional view according to FIG. 2, the powder-conveying injector 100 is provided with corresponding seals 8 via which the powder-conveying injector 100 can be sealed vis-à-vis a housing 20 of the dilute phase powder pump 51 when the powder-conveying injector 100 is accommodated in the housing 20 of the dilute phase powder pump 51.

Specifically, it is thereby preferential for at least two circumferential sealing areas 8a, 8b to be provided, whereby a narrow channel or annular groove 22 is formed between the two circumferential sealing areas 8a, 8b. The conveying air inlet 7 of the drive nozzle 1 also opens into this area where the narrow channel or annular groove 22 is formed between the two circumferential sealing areas 8a, 8b.

FIG. 3 shows a schematic and sectional view of the exemplary embodiment of the powder-conveying injector according to FIG. 2 in a state in which the powder-conveying injector 100 is at least partially accommodated in a housing 20 of the dilute phase powder pump 51.

As depicted, the housing 20 of the dilute phase powder pump 51 thereby comprises a seating 21, the size of which is adapted to the outer diameter and outer configuration of at least the upstream end region of the first region (drive nozzle 1) of the powder-conveying injector 100. The sealing rings 8a, 8b of the powder-conveying injector 100 seal at least the upstream end region of the powder-conveying injector 100 vis-à-vis the wall of the seating 21 provided in the housing 20 of the dilute phase powder pump 51.

To be further seen from the FIG. 3 depiction is that that the narrow channel or annular groove 22 formed between the two circumferential sealing areas 8a, 8b of the powder-conveying injector 100 forms an annular space with the wall of the seating 21 of the housing 20 of the dilute phase powder pump 51, whereby this annular space is fluidly connected by means of a conveying air connection 23 formed in the housing 20 of the dilute phase powder pump 51.

To be further seen from the FIG. 3 schematic sectional view is that a powder line connection 24 is fit to the downstream end area of the second region of the powder-conveying injector 100 (collecting nozzle 11) and in particular detachably connected to the downstream end area.

To that end, the powder line connection 24 has a receiving channel arranged axially with respect to the longitudinal axis L of the stream collecting channel 12 in which the downstream end region of the collecting nozzle 11 can be at least partially received. Furthermore—as indicated schematically in FIG. 3—the powder line connection 24 can comprise a corresponding seal 25 in order to seal in particular the powder line connection 24 vis-à-vis the housing 20 of the dilute phase powder pump 51.

The powder line connection 24 can be fit to the downstream end region of the collecting nozzle 11 such that an annular space 26 delimited by the housing 20 of the dilute phase powder pump 51, the powder line connection 24 as well as the powder-conveying injector 100 is formed which is fluidly connected to a supplementary air duct 27 formed in the housing 20 of the dilute phase powder pump 51. The supplementary air duct 27 can supply supplementary air to the annular space 27 which can be added to the powder/air mixture conveyed by the powder-conveying injector 100.

Returning to the FIG. 1 depiction, the exemplary embodiment of the dilute phase powder pump 51 in which a powder-conveying injector 100 according to FIG. 2 is used will be described in greater detail in the following.

During the operation of the dilute phase powder pump 51, conveying air is supplied via the conveying air inlet 7 of the drive nozzle 1 of the powder-conveying injector 100, said air flowing out toward the stream collecting channel 12 via the nozzle opening 4 of the drive nozzle 1. Due to the nozzle-shaped configuration of at least the upstream region of the stream collecting channel 12, the conveying air is pressed into the collecting nozzle 11 and, because of the relatively small diameter of the nozzle opening of the drive nozzle 1, a high-speed airflow is formed, whereby a negative pressure forms in the area of the powder inlet of the powder-conveying injector 100. As a result of this negative pressure forming in the powder inlet area during the operation of the dilute phase powder pump 51, powder or respectively coating powder is drawn in when the powder inlet of the first region of the powder-conveying injector 100 serving as the drive nozzle 1 is fluidly connected to a suitable powder container or the like via a powder line, etc.

As can further be seen from the schematic sectional view according to FIG. 1, the powder-conveying injector 100 is accommodated in a seating of the dilute phase powder pump 51 realized as a pump module such that the pump module serves as housing 20, or the injector housing respectively, in respect of the powder-conveying injector 100.

Additionally to the above-described powder-conveying injector 100, the dilute phase powder pump 51 of the exemplary embodiment designed as a pump module exhibits a pinch valve 40 which is arranged in a flow path between the powder inlet 80 of the pump module and the powder inlet 5 of the drive nozzle 1 of the powder-conveying injector 100.

Said pinch valve 40 can preferably be controlled by a control device of the dilute phase powder pump 51 so as to interrupt a fluidic connection between the powder inlet 80 of the pump module and the powder inlet 5 of the drive nozzle 1 of the powder-conveying injector 100 as needed. Such an interruption of the flow path preferably occurs—as will be described in greater detail below—in a cleaning mode of the dilute phase powder pump 51.

It is moreover conceivable for a compressed air inlet device 30 to be provided between the pinch valve 40 and the powder inlet 5 of the drive nozzle 1 of the powder-conveying injector 100 in order to supply compressed air to the powder-conveying injector 100 when needed. Specifically provided with the exemplary embodiment of the dilute phase powder pump 51 shown in FIG. 1 is for the compressed air inlet device 30 to be arranged in the flow path between the pinch valve 40 and the powder inlet 5 of the drive nozzle 1 of the powder-conveying injector 100.

The pump module as such comprises a first compressed air connection 7 via which conveying air can be fed to the drive nozzle 1 of the powder-conveying injector 100. The pump module furthermore comprises a second compressed air connection 27 via which supplementary air can be fed to the powder-conveying injector 100.

In addition thereto, the pump module exhibits a third compressed air connection via which compressed air can be fed to the compressed air inlet device 30 as needed and a fourth compressed air connection via which an appropriate control pressure can be furnished to the pinch valve 40 for actuating said pinch valve 40.

The pressures required to operate the dilute phase powder pump 51 designed as a pump module are provided by a corresponding compressed air control of the dilute phase powder pump 51.

As depicted, the pump housing 20 of the dilute phase powder pump 51 in which the powder-conveying injector 100 is at least partially accommodated exhibits a powder supply channel 60 which fluidly connects the powder inlet 80 of the dilute phase powder pump 51 to the powder inlet 5 of the drive nozzle 1 of the powder-conveying injector 100. The previously mentioned pinch valve 40 is thereby designed to disconnect a fluidic connection formed by the powder supply channel 60 between the powder inlet 80 of the dilute phase powder pump 51 and the powder inlet 5 of the drive nozzle 1 of the powder-conveying injector 100 when needed.

The exemplary embodiment of the dilute phase powder pump 51 provides for the powder supply channel 60 to run in a straight line along a longitudinal axis L, whereby this longitudinal axis L of the powder supply channel 60 coincides with a longitudinal axis L defined by the stream collecting channel 12 or, respectively, runs parallel to a longitudinal axis L defined by the stream collecting channel.

As depicted in FIG. 1, the exemplary embodiment of the dilute phase powder pump 51 further comprises a compressed air inlet device 30 which opens into the fluidic connection at a point between the powder inlet 80 of the dilute phase powder pump 51 and the powder inlet 5 of the drive nozzle 1 of the powder-conveying injector 100 in order to provide supplementary compressed air as additional compressed conveying air or purge air (in a cleaning mode of the dilute phase powder pump 51) as required.

In detail, the compressed air inlet device 30 is arranged at a point between the pinch valve 40 and the powder inlet 5 of the drive nozzle 1 of the powder-conveying injector 100 and opens into the fluidic connection at that point.

The dilute phase powder pump 51, as schematically depicted for example in FIG. 1 further comprises a device for the functional testing of the dilute phase powder pump 51 or components thereof. To that end, the functional testing device comprises at least one pressure sensor (not depicted in the figures) for detecting a static and/or dynamic pressure in an area in the fluidic connection between the powder inlet 80 of the dilute phase powder pump 51 and the powder inlet 5 of the drive nozzle 1 of the powder-conveying injector 100.

In the exemplary embodiment of the dilute phase powder pump 51, the at least one pressure sensor of the functional testing device is in particular designed to detect a static and/or dynamic pressure in an area in the fluidic connection between the pinch valve 40 and the powder inlet 5 of the drive nozzle 1 of the powder-conveying injector 100. Alternatively or additionally, the at least one pressure sensor is further designed to detect the chronological progression of a static and/or dynamic pressure over a definable period of time.

In the embodiment of the dilute phase powder pump 51 shown schematically in FIG. 1, a filter 61 is allocated to the compressed air inlet device 30 which is permeable to air but not to coating powder. The at least one pressure sensor of the functional testing device is preferably connected to a compressed air path which extends from a compressed air line 58 allocated to the compressed air inlet device 30 to the air side of the filter. The filter 61 thereby separates the air side from the fluidic connection between the powder inlet 80 of the dilute phase powder pump 51 and the powder inlet 5 of the drive nozzle 1 of the powder-conveying injector 100.

The dilute phase powder pump 51 exhibits a conveying air inlet 7 allocated to the powder-conveying injector 100 in order to supply conveying air to the drive nozzle 1 of the powder-conveying injector 100. The dilute phase powder pump 51 furthermore exhibits a supplementary air inlet 27 allocated to the powder-conveying injector 100 in order to supply supplementary air into the flow path of a powder/conveying air mixture at the powder outlet 81 of the dilute phase powder pump 51. Although not depicted in the drawings, it is of advantage for at least one air setting element to be provided in order to set a volume of conveying air supplied to the conveying air inlet per unit of time and/or a volume of supplementary air supplied to the supplementary air inlet per unit of time.

The following will describe the functions able to be realized by the functional testing device in greater detail.

In detail, the device for functional testing is designed to detect at least one and preferably all of the following situations:

wear and/or degree of wear of the collecting nozzle 11;
an at least partial blockage at the powder outlet 81 of the dilute phase powder pump 51;
an at least partial blockage at the powder inlet 80 of the dilute phase powder pump 51; and
a deficiency of coating powder in the powder reservoir fluidly connected to the powder inlet 80 of the dilute phase powder pump 51.

To that end, in addition to the at least one pressure sensor, the functional testing device is preferably also allocated an actual powder rate value sensor which is arranged in or near the powder-conveying injector 100 on or in the flow path of the powder/conveying air mixture at the powder outlet 81 of the dilute phase powder pump 51 and designed to detect a respective actual powder rate value delivered by the powder-conveying injector 100.

The functional testing device of the dilute phase powder pump 51 or components thereof respectively can for example detect the wear and/or degree of wear of the collecting nozzle 11 of the powder-conveying injector 100 by supplying the powder-conveying injector 100 with a predefined volume of conveying air per unit of time via conveying air inlet 7 and supplying the powder-conveying injector 100 with a fixed volume of supplementary air per unit of time via supplementary air inlet 27. The resulting negative pressure at the powder inlet 5 of the drive nozzle 1 of the powder-conveying injector 100 with closed pinch valve 40 is subsequently determined. This negative pressure decreases depending on the degree of collecting nozzle 11 wear, and that at the same rate of conveying air and supplementary air.

The dilute phase powder pump 51 therefore preferably comprises an evaluation device assigned to the functional testing device which is designed to compare the actual pressure value to respective predefined or detected target pressure values. Should the difference between the actual value and the target value exceed a predefined value, the evaluation device emits a corresponding signal recommending the replacement of the collecting nozzle 11.

Alternatively or additionally, the functional testing device is designed to readjust the conveying air rate and/or supplementary air rate as a function of the detected degree of wear of the collecting nozzle 11 in order to equalize the volumetric powder flow reduced due to the degree of collecting nozzle 11 wear, and in particular do so by increasing the rate of conveying air. This readjustment preferably ensues automatically, in particular selectively automatically.

The functional testing device is further designed to detect an at least partial blockage at the powder outlet 81 of the dilute phase powder pump 51 and issue appropriate warnings or notifications. This is thereby based on the awareness of a partial or complete blockage at the powder outlet 81 of the dilute phase powder pump 51 causing back pressure which is detectable by the pressure sensor.

Since the pressure sensor is in particular also designed to detect a chronological progression of particularly a static pressure, the chronological progression of the collecting nozzle wear, or a blockage at the powder outlet of the dilute phase powder pump 51 respectively, can also be detected with the help of the functional testing device.

Furthermore, the device for functional testing can also aid in detecting an at least partial blockage at the powder inlet 80 of the dilute phase powder pump 51. To that end, with the pinch valve 40 closed and with a predefined conveying air and supplementary air rate, the negative pressure established at the powder inlet of the powder-conveying injector 100 is first detected. This negative pressure should draw in the coating powder—if the powder inlet of the dilute phase powder pump 51 is not blocked—via the powder inlet 80 of the dilute phase powder pump 51. The pressure detectable by the pressure sensor at the powder inlet of the powder-conveying injector 100 then in turn increases. If, however, the pressure does not increase when the pinch valve 40 is open, or fails to exceed a predefined value respectively, the functional testing device automatically, and particularly preferably automatically, identifies an at least partial blockage at the powder inlet of the dilute phase powder pump 51.

If, on the other hand, the pressure exceeds a predefined upper threshold when the pinch valve 40 is open, this is attributed to a deficiency of coating powder in the powder reservoir fluidly connected to the powder inlet 80 of the dilute phase powder pump 51.

The functional testing device is further designed to detect a powder line back pressure. With the pinch valve 40 closed, a predefined volume of supplementary compressed air is thereto fed per unit of time to the powder supply channel formed in the pump housing via the compressed air inlet device 30. The back pressure detectable by the pressure sensor then varies depending on the flow resistance and/or the length of a powder line fluidly connected to the powder outlet of the dilute phase powder pump 51. This in turn allows a conclusion as to the length of the powder line fluidly connected to the powder outlet of the dilute phase powder pump 51 or, respectively, a conclusion as to the flow resistance of said powder line.

To that end, the functional testing device preferably comprises a storage device for which is stored target values of a static pressure in the area of the fluidic connection between the powder inlet 80 of the dilute phase powder pump 51 and the powder inlet 5 of the drive nozzle 1 of the powder-conveying injector 100 for different powder hoses or powder lines fluidly connected at the powder outlet of the dilute phase powder pump 51 for defined values of the volume of conveying air or respectively supplementary air supplied to the conveying air inlet/supplementary compressed air inlet per unit of time. The evaluation device is thereby designed to detect the pressure of a powder hose/powder line actually connected fluidly at the powder outlet of the dilute phase powder pump 51, in particular its length and/or its flow resistance, on the basis of the pressure value detected by the at least one pressure sensor and in consideration of the target values stored in the storage device.

It is again an advantage for the dilute phase powder pump 51 to automatically set the conveying air rate and/or the supplementary air rate as a function of the length of the powder line or its flow resistance respectively.

Figure 4:
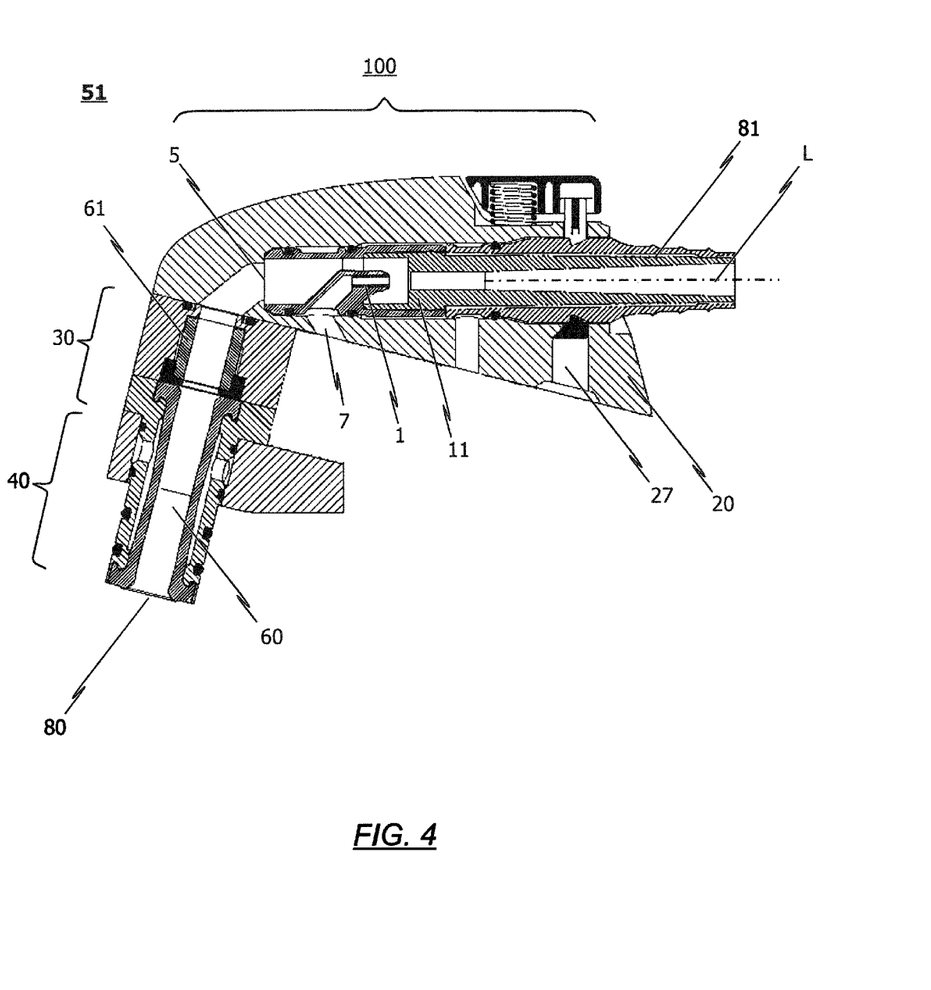
FIG. 4 a schematic sectional view of a further exemplary embodiment of the dilute phase powder pump according to the present disclosure.

The following will reference the illustration provided in FIG. 4 in describing a further exemplary embodiment of the dilute phase powder pump 51.

Briefly summarized, the further exemplary embodiment of the dilute phase powder pump 51 exhibits a configuration which in principle corresponds to the configuration of the dilute phase powder pump 51 described above with reference to the FIG. 1 illustration.

As with the embodiment described with reference to the FIG. 1 illustration, the dilute phase powder pump 51 according to FIG. 4 is designed to serve powder/coating powder from a (not shown) powder reservoir to a (likewise not shown in FIG. 1) powder spraying device.

The exemplary embodiment of the dilute phase powder pump 51 according to the present disclosure, as shown schematically in FIG. 4, is again characterized by a modular construction and essentially consists of a powder inlet/pinch valve module 40, a compressed air inlet module 30 and a powder-conveying injector 100 designed as a pump module at the powder outlet 81 of the dilute phase powder pump 51. These modules are preferably detachably connected to each other in order to form a particularly compact dilute phase powder pump 51.

As depicted schematically in FIG. 4, the dilute phase powder pump 51 comprises a powder inlet 80 on the powder inlet/pinch valve module 40 which is fluidly connected or connectable to the aforementioned (and not shown in FIG. 4) powder reservoir by means of a powder line (not shown in FIG. 4), in particular by means of an intake hose or the like. The powder inlet/pinch valve module 40 with powder inlet 80 are angled approximately 60 to 70° in the direction of the (not shown) powder reservoir relative to the longitudinal axis L of the powder outlet 81 of the dilute phase powder pump 51; i.e. downward in FIG. 4, so that at least some of the areas of the powder inlet/pinch valve module 40 serve as an intake hose, which improves the overall response behavior of the dilute phase powder pump 51.

The aforementioned powder outlet 81 is provided at an opposite end region of the dilute phase powder pump 51 and is fluidly connected or connectable to a powder inlet of a powder spraying device (a coating gun in particular) by means of a powder line (not shown in FIG. 4), particularly by means of a powder hose.

Specifically, both the powder inlet 80 of the dilute phase powder pump 51 as well as the powder outlet 81 of the dilute phase powder pump 51 in the exemplary embodiment shown in FIG. 4 are respectively designed as hose connectors to which the corresponding powder line/corresponding powder hose can be attached and fixed by means of e.g. a hose clamp. Of course, other embodiments for the powder inlet 80 or powder outlet 81 respectively of the dilute phase powder pump 51 are also possible.

The dilute phase powder pump 51 according to FIG. 4 comprises a powder-conveying injector 100 which works according to the injector principle or the Venturi tube principle. The dilute phase powder pump 51 has a powder-conveying injector 100 to that end in which a current of air generates a negative pressure in a negative pressure area formed by channel widening, whereby said negative pressure is used to draw powder, or coating powder respectively, from the powder reservoir via the powder inlet 80 of the dilute phase powder pump 51. The withdrawn powder or coating powder is entrained by the current and carried to the spraying device. By regulating the airstream's rate of flow, the negative pressure and thus the amount of powder conveyed can be adjusted.

An exemplary embodiment of a powder-conveying injector 100 suitable for use in the dilute phase powder pump 51 according to FIG. 4 is shown in FIGS. 2 and 3. To avoid repetition, reference is made at this point to the previous remarks relative to the exemplary embodiment of the powder-conveying injector 100.

According thereto, when the dilute phase powder pump 51 is in operation, conveying air is supplied via the conveying air inlet 7 of the drive nozzle 1 of the powder-conveying injector 100, said air flowing out toward the stream collecting channel 12 via the nozzle opening of the drive nozzle. Due to the nozzle-shaped configuration of at least the upstream region of the stream collecting channel 12, the conveying air is pressed into the collecting nozzle 11 and, due to the relatively small diameter of the nozzle opening of the drive nozzle 1, a high-speed airflow is formed, whereby a negative pressure forms in the area of the powder inlet of the powder-conveying injector 100. As a result of this negative pressure forming in the powder inlet area during the operation of the dilute phase powder pump 51, powder/coating powder is drawn in when the powder inlet of the first region of the powder-conveying injector 100 serving as the drive nozzle 1 is fluidly connected to a suitable powder container or the like via a powder line, etc.

As can be seen in the schematic sectional view according to FIG. 4, the powder-conveying injector 100 is accommodated in a seating of the dilute phase powder pump 51 realized as a pump module such that the pump module serves as a housing 20 or respectively injector housing in respect of the powder-conveying injector 100.

In addition to the previously described powder-conveying injector 100, the dilute phase powder pump 51 of the exemplary embodiment designed as a pump module exhibits a pinch valve 40 which is arranged in a flow path between the powder inlet 80 of the pump module and the powder inlet 5 of the drive nozzle 1 of the powder-conveying injector 100. In the embodiment of the dilute phase powder pump 51 shown in FIG. 4, the pinch valve 40 is part of the powder inlet/pinch valve module 40.

Said pinch valve 40 can preferably be controlled by a control device of the dilute phase powder pump 51 so as to interrupt a fluidic connection between the powder inlet 80 of the pump module and the powder inlet 5 of the drive nozzle 1 of the powder-conveying injector 100 as needed. Such an interruption of the flow path preferably occurs—as will be described in greater detail below—in a cleaning mode of the dilute phase powder pump 51.

It is moreover conceivable for a compressed air inlet device 30 to be provided between the pinch valve 40 and the powder inlet 5 of the drive nozzle 1 of the powder-conveying injector 100 in order to supply compressed air to the powder-conveying injector 100 when needed. Specifically provided with the exemplary embodiment of the dilute phase powder pump 51 shown in FIG. 4 is for the compressed air inlet device 30 to be arranged in the flow path between the pinch valve 40 and the powder inlet 5 of the drive nozzle 1 of the powder-conveying injector 100.

The pump module as such comprises a first compressed air connection 7 via which conveying air can be fed to the drive nozzle 1 of the powder-conveying injector 100. The pump module furthermore comprises a second compressed air connection 27 via which supplementary air can be fed to the powder-conveying injector 100.

In addition thereto, the pump module exhibits a third compressed air connection via which compressed air can be fed to the compressed air inlet device 30 as needed and a fourth compressed air connection via which an appropriate control pressure can be furnished to the pinch valve 40 for actuating said pinch valve 40.

The pressures required to operate the dilute phase powder pump 51 designed as a pump module are provided by a corresponding compressed air control of the dilute phase powder pump 51.

As depicted, the pump housing 20 of the dilute phase powder pump 51 in which the powder-conveying injector 100 is at least partially accommodated exhibits a powder supply channel 60 which fluidly connects the powder inlet 80 of the dilute phase powder pump 51 to the powder inlet 5 of the drive nozzle 1 of the powder-conveying injector 100. The previously mentioned pinch valve 40 is thereby designed to disconnect a fluidic connection formed by the powder supply channel 60 between the powder inlet 80 of the dilute phase powder pump 51 and the powder inlet 5 of the drive nozzle 1 of the powder-conveying injector 100 when needed.

As depicted in FIG. 4, the exemplary embodiment of the dilute phase powder pump 51 further comprises a compressed air inlet device 30 which opens into the fluidic connection between the powder inlet 80 of the dilute phase powder pump 51 and the powder inlet 5 of the drive nozzle 1 of the powder-conveying injector 100 at least at one point in order to supply supplementary compressed air as additional compressed conveying air or purge air (in a cleaning mode of the dilute phase powder pump 51) as required.

In detail, the compressed air inlet device 30 is arranged at a point between the pinch valve 40 and the powder inlet 5 of the drive nozzle 1 of the powder-conveying injector 100 and opens into the fluidic connection at that point.

The dilute phase powder pump 51, as schematically depicted for example in FIG. 4, further comprises a device for the functional testing of the dilute phase powder pump 51 or components thereof. To that end, the functional testing device comprises at least one pressure sensor (not depicted in the figures) for detecting a static and/or dynamic pressure in an area in the fluidic connection between the powder inlet 80 of the dilute phase powder pump 51 and the powder inlet 5 of the drive nozzle 1 of the powder-conveying injector 100.

As with the embodiment of the dilute phase powder pump 51 shown in FIG. 1, the at least one pressure sensor of the functional testing device is in particular designed to detect a static and/or dynamic pressure in an area in the fluidic connection between the pinch valve 40 and the powder inlet 5 of the drive nozzle 1 of the powder-conveying injector 100. Alternatively or additionally, the at least one pressure sensor is further designed to detect the chronological progression of a static and/or dynamic pressure over a definable period of time.

In the embodiment of the dilute phase powder pump 51 shown schematically in FIG. 4, a filter 61 is allocated to the compressed air inlet device 30 which is permeable to air but not to coating powder. The at least one pressure sensor of the functional testing device is preferably connected to a compressed air path which extends from a compressed air line (not shown in FIG. 4) allocated to the compressed air inlet device 30 to the air side of the filter. The filter 61 thereby separates the air side from the fluidic connection between the powder inlet 80 of the dilute phase powder pump 51 and the powder inlet 5 of the drive nozzle 1 of the powder-conveying injector 100.

The dilute phase powder pump 51 exhibits a conveying air inlet 7 allocated to the powder-conveying injector 100 for supplying conveying air to the drive nozzle 1 of the powder-conveying injector 100. The dilute phase powder pump 51 furthermore exhibits a supplementary air inlet 27 allocated to the powder-conveying injector 100 for supplying supplementary air into the flow path of a powder/conveying air mixture at the powder outlet 81 of the dilute phase powder pump 51. Although not depicted in the drawings, it is of advantage for at least one air setting element to be provided in order to set a volume of conveying air supplied to the conveying air inlet per unit of time and/or a volume of supplementary air supplied to the supplementary air inlet per unit of time.

In functional terms, the device for functional testing used in the dilute phase powder pump 51 schematically depicted in FIG. 4 corresponds to the functional testing device used in the dilute phase powder pump 51 schematically depicted in FIG. 1.

In detail, the device for functional testing is thus designed to detect at least one and preferably all of the following situations:

wear and/or degree of wear of the collecting nozzle 11;

an at least partial blockage at the powder outlet 81 of the dilute phase powder pump 51;

an at least partial blockage at the powder inlet 80 of the dilute phase powder pump 51; and a deficiency of coating powder in the powder reservoir fluidly connected to the powder inlet 80 of the dilute phase powder pump 51.

To that end, in addition to the at least one pressure sensor, the functional testing device is preferably also allocated an actual powder rate value sensor which is arranged in or near the powder-conveying injector 100 on or in the flow path of the powder/conveying air mixture at the powder outlet 81 of the dilute phase powder pump 51 and designed to detect a respective actual powder rate value delivered by the powder-conveying injector 100.

The functional testing device of the dilute phase powder pump 51 or components thereof respectively can for example detect the wear and/or degree of wear of the collecting nozzle 11 of the powder-conveying injector 100 by supplying the powder-conveying injector 100 with a predefined volume of conveying air per unit of time via conveying air inlet 7 and supplying the powder-conveying injector 100 with a fixed volume of supplementary air per unit of time via supplementary air inlet 27. The resulting negative pressure at the powder inlet 5 of the drive nozzle 1 of the powder-conveying injector 100 with closed pinch valve 40 is subsequently detected. This negative pressure decreases depending on the degree of collecting nozzle 11 wear, and that at the same rate of conveying air and supplementary air.

The dilute phase powder pump 51 therefore preferably comprises an evaluation device assigned to the functional testing device which is designed to compare the actual pressure value to respective predefined or detected target pressure values. Should the difference between the actual value and the target value exceed a predefined value, the evaluation device emits a corresponding signal recommending the replacement of the collecting nozzle 11.

Alternatively or additionally, the functional testing device is designed to readjust the conveying air rate and/or supplementary air rate as a function of the detected degree of wear of the collecting nozzle 11 in order to equalize the volumetric powder flow reduced due to the degree of collecting nozzle 11 wear, and in particular do so by increasing the rate of conveying air. This readjustment preferably ensues automatically, in particular selectively automatically.

The functional testing device is further designed to detect an at least partial blockage at the powder outlet 81 of the dilute phase powder pump 51 and issue appropriate warnings or notifications. This is thereby based on the awareness of a partial or complete blockage at the powder outlet 81 of the dilute phase powder pump 51 causing back pressure which is detectable by the pressure sensor.

Since the pressure sensor is in particular also designed to detect a chronological progression of particularly a static pressure, the chronological progression of the collecting nozzle wear, or a blockage at the powder outlet of the dilute phase powder pump 51 respectively, can also be detected with the help of the functional testing device.

Furthermore, the device for functional testing can also aid in detecting an at least partial blockage at the powder inlet 80 of the dilute phase powder pump 51. To that end, with the pinch valve 40 closed and with a predefined conveying air and supplementary air rate, the negative pressure established at the powder inlet of the powder-conveying injector 100 is first detected. This negative pressure should draw in the coating powder—if the powder inlet of the dilute phase powder pump 51 is not blocked—via the powder inlet 80 of the dilute phase powder pump 51. The pressure detectable by the pressure sensor at the powder inlet of the powder-conveying injector 100 then in turn increases. If, however, the pressure does not increase when the pinch valve 40 is open, or fails to exceed a predefined value respectively, the functional testing device automatically, and particularly preferably automatically, identifies an at least partial blockage at the powder inlet of the dilute phase powder pump 51.

If, on the other hand, the pressure exceeds a predefined upper threshold when the pinch valve 40 is open, this is attributed to a deficiency of coating powder in the powder reservoir fluidly connected to the powder inlet 80 of the dilute phase powder pump 51.

The functional testing device is further designed to detect a powder line back pressure. With the pinch valve 40 closed, a predefined volume of supplementary compressed air is thereto fed per unit of time to the powder supply channel formed in the pump housing via the compressed air inlet device 30. The back pressure detectable by the pressure sensor then varies depending on the flow resistance and/or the length of a powder line fluidly connected to the powder outlet of the dilute phase powder pump 51. This in turn allows a conclusion as to the length of the powder line fluidly connected to the powder outlet of the dilute phase powder pump 51 or, respectively, a conclusion as to the flow resistance of said powder line.

To that end, the functional testing device preferably comprises a storage device for which is stored target values of a static pressure in the area of the fluidic connection between the powder inlet 80 of the dilute phase powder pump 51 and the powder inlet 5 of the drive nozzle 1 of the powder-conveying injector 100 for different powder hoses or powder lines fluidly connected at the powder outlet of the dilute phase powder pump 51 for defined values of the volume of conveying air or respectively supplementary air supplied to the conveying air inlet/supplementary compressed air inlet per unit of time. The evaluation device is thereby designed to detect the pressure of a powder hose/powder line actually connected fluidly at the powder outlet of the dilute phase powder pump 51, in particular its length and/or its flow resistance, on the basis of the pressure value detected by the at least one pressure sensor and in consideration of the target values stored in the storage device.

It is again an advantage for the dilute phase powder pump 51 to automatically set the conveying air rate and/or the supplementary air rate as a function of the length of the powder line or its flow resistance respectively.

The invention is not limited to the exemplary embodiments depicted in the drawings but rather yields from an integrated overall consideration of all the features disclosed herein.

The invention claimed is:

1. A dilute phase powder pump for conveying powder from a powder reservoir to a powder spraying device, wherein the dilute phase powder pump is a modular construction, the dilute phase powder pump comprising:

a powder inlet module at a powder inlet of the dilute phase powder pump, which wherein the powder inlet module is fluidly connected or connectable to the powder reservoir, a pinch valve module, a compressed air inlet module, and a powder-conveying injector designed as a pump module and having a drive nozzle and a collecting nozzle, the pump module being arranged at a powder outlet of the dilute phase powder pump, wherein the powder outlet is fluidly connected or connectable to the powder spraying device, wherein the powder inlet module, the pinch valve module, the compressed air inlet module, and the powder-conveying injector designed as a pump module are detachably connected to each other, wherein the compressed air inlet module is arranged between the powder conveying injector designed as a pump module and the pinch valve module, wherein the powder-conveying injector designed as a pump module is configured to selectively interrupt a fluidic connection between the powder inlet of the dilute phase powder pump and a powder inlet of the drive nozzle, and wherein a device for functional testing of the dilute phase powder pump or components of the dilute phase powder pump is provided, said device for functional testing comprising at least one pressure sensor for detecting a static and/or dynamic pressure in an area in the fluidic connection between the powder inlet of the dilute phase powder pump and the powder inlet of the drive nozzle, wherein the at least one pressure sensor is further designed to detect a static and/or dynamic pressure in an area in the fluidic connection between the valve device and the powder inlet of the drive nozzle.

2. The dilute phase powder pump according to claim 1, wherein the pinch valve module comprises a pneumatically actuatable pinch valve provided in a flow path between the powder inlet of the dilute phase powder pump and the powder inlet of the drive nozzle.

3. The dilute phase powder pump according to claim 1, wherein the collecting nozzle exhibits a stream collecting channel distanced axially opposite from the drive nozzle, and wherein the powder inlet of the drive nozzle is distanced axially opposite from the stream collecting channel.

4. The dilute phase powder pump according to claim 3, wherein the powder inlet of the drive nozzle is aligned with respect to an axis which coincides with a longitudinal axis defined by the stream collecting channel or runs parallel to the longitudinal axis defined by the stream collecting channel.

5. The dilute phase powder pump according to claim 1, wherein a pump housing is provided in which the powder-conveying injector is at least partially accommodated, wherein a powder supply channel is formed in the pump housing which fluidly connects the powder inlet of the dilute phase powder pump to the powder inlet of the drive nozzle, wherein the valve device is designed to disconnect a fluidic connection formed by the powder supply channel between the powder inlet of the dilute phase powder pump and the powder inlet of the drive nozzle.

6. The dilute phase powder pump according to claim 5, wherein the collecting nozzle exhibits a stream collecting channel distanced axially opposite from the drive nozzle, and wherein the powder inlet of the drive nozzle is distanced axially opposite from the stream collecting channel; and wherein the powder supply channel runs in a straight line along a longitudinal axis thereof, wherein the longitudinal axis of the powder supply channel coincides with a longitudinal axis defined by the stream collecting channel or runs parallel to a longitudinal axis defined by the stream collecting channel.

7. The dilute phase powder pump according to claim 1, wherein the at least one pressure sensor is designed to detect the chronological progression of a static and/or dynamic pressure over a definable period of time.

8. The dilute phase powder pump according to claim 1, wherein a pump housing is provided in which the powder-conveying injector is at least partially accommodated, wherein a powder supply channel is formed in the pump housing which fluidly connects the powder inlet of the dilute phase powder pump to the powder inlet of the drive nozzle, wherein the valve device is designed to disconnect a fluidic connection formed by the powder supply channel between the powder inlet of the dilute phase powder pump and the powder inlet of the drive nozzle; and wherein a filter permeable to air but not to powder is allocated to the compressed air inlet device, wherein the at least one pressure sensor is connected to a compressed air path which extends from a compressed air line allocated to the compressed air inlet device to an air side of the filter, and wherein the filter separates the air side from the fluidic connection between the powder inlet of the dilute phase powder pump and the powder inlet of the drive nozzle.

9. The dilute phase powder pump according to claim 1, wherein the device for functional testing comprises at least one actual powder rate value sensor which is arranged in or near the powder-conveying injector on or in a flow path of the powder/conveying air mixture at the powder outlet of the dilute phase powder pump for detecting a corresponding actual powder rate value delivered by the powder-conveying injector.

10. The dilute phase powder pump according to claim 1, wherein the dilute phase powder pump comprises a conveying air inlet allocated to the powder-conveying injector for supplying conveying air to the drive nozzle and a supplementary air inlet allocated to the powder-conveying injector for supplying supplementary air into a flow path of a powder/conveying air mixture at the powder outlet of the dilute phase powder pump, wherein at least one air setting element is provided for setting a volume of conveying air supplied to the conveying air inlet per unit of time and/or for setting a volume of supplementary air supplied to the supplementary air inlet per unit of time.

11. The dilute phase powder pump according to claim 10, wherein the device for functional testing comprises an evaluation device for evaluating the static and/or dynamic pressure value detected by the at least one pressure sensor and/or for evaluating a chronological progression of the static and/or dynamic pressure detected by the at least one pressure sensor, wherein the evaluation device is designed to detect at least one of the following situations on the basis of the pressure value detected by the at least one pressure sensor and/or the progression of pressure detected by the at least one pressure sensor as well as on the basis of the volume of conveying air or supplementary air respectively supplied to the conveying air inlet and/or the supplementary air inlet per unit of time:

wear and/or degree of wear of the collecting nozzle;

an at least partial blockage at the powder outlet of the dilute phase powder pump;

an at least partial blockage at the powder inlet of the dilute phase powder pump; and a deficiency of powder, particularly coating powder, in the powder reservoir fluidly connected to the powder inlet of the dilute phase powder pump.

12. The dilute phase powder pump according to claim 11, wherein the device for functional testing comprises a storage device in which are stored target values of a static pressure in an area of the fluidic connection between the powder inlet of the dilute phase powder pump and the powder inlet of the drive nozzle for different powder hoses fluidly connected at the powder outlet of the dilute phase powder pump for defined values of the volume of conveying air or supplementary air supplied to the conveying air inlet and/or supplementary compressed air inlet per unit of time, and wherein the evaluation device is designed to detect the pressure of a powder hose actually connected fluidly at the powder outlet of the dilute phase powder pump, in particular its length and/or its flow resistance, on the basis of the pressure value detected by the at least one pressure sensor and/or the progression of pressure detected by the at least one pressure sensor and in consideration of the target values stored in the storage device.

\* \* \* \* \*